United States Patent

Inschlag

[11] Patent Number: 6,023,142
[45] Date of Patent: Feb. 8, 2000

[54] RECORDING AND/OR REPRODUCING APPARATUS HAVING AN ACTIVE MODE ACTIVABLE BY MEANS OF A DRIVE MOTOR

[75] Inventor: Josef Inschlag, Bruck and der Lafnitz, Austria

[73] Assignee: U.S. Philips Corporation, New York, N.Y.

[21] Appl. No.: 09/277,652

[22] Filed: Mar. 26, 1999

[30] Foreign Application Priority Data

Mar. 27, 1998 [EP] European Pat. Off. .............. 98890085

[51] Int. Cl.⁷ .................................................. G11B 15/05
[52] U.S. Cl. ............................................. 318/591; 360/69
[58] Field of Search .................... 318/590, 591, 318/459; 360/69, 70, 71

[56] References Cited

U.S. PATENT DOCUMENTS

| | | | |
|---|---|---|---|
| 4,425,590 | 1/1984 | Johnstone et al. | 360/71 |
| 4,633,346 | 12/1986 | Sasaki et al. | 360/78.13 |
| 5,319,466 | 6/1994 | Gedl | 358/310 |

FOREIGN PATENT DOCUMENTS

| | | |
|---|---|---|
| 0279059B1 | 8/1988 | European Pat. Off. . |
| 0475524A1 | 3/1992 | European Pat. Off. . |

*Primary Examiner*—Bentsu Ro
*Attorney, Agent, or Firm*—Steven R. Biren

[57] ABSTRACT

A recording and/or reproducing apparatus (1) comprises a record carrier holder (8) into which a record carrier (7) can be loaded in a loading position of the record carrier holder (8) and which is movable by hand from its loading position into a switching position. A drive motor (9) is coupled to the record carrier holder (8) via a drive transmission (10) to move the record carrier holder (8) from its switching position into an operating position. The drive motor (9) supplies at least one generator pulse (GI) when the record carrier holder (8) is moved by hand from its loading position into its switching position, which generator pulse can be detected by a comparator device (17), which in response thereto supplies activation information (AI) to a mode activation stage (20). The mode activation stage (20) is adapted to activate an active mode upon the occurrence of activation information (AI) while the recording and/or reproducing apparatus (1) is in the power saving mode.

4 Claims, 1 Drawing Sheet

RECORDING AND/OR REPRODUCING APPARATUS HAVING AN ACTIVE MODE ACTIVABLE BY MEANS OF A DRIVE MOTOR

BACKGROUND OF THE INVENTION

The invention relates to a recording and/or reproducing apparatus comprising a record carrier holder constructed to receive a record carrier in a loading position of the record carrier holder, and comprising a drive motor serving to move the record carrier holder from a switching position of the record carrier holder into an operating position of the record carrier holder via a drive transmission, the drive motor being adapted to supply at least one generator pulse when the record carrier holder is moved by hand from loading position into the switching position.

Such a recording and/or reproducing apparatus of the type defined in the opening paragraph is known from the document EP 0,279,059 B1. The known recording and/or reproducing apparatus takes the form of a video recorder. The video recorder has a record carrier holder which is movable into a loading position. When the record carrier holder is in its loading position a cassette, which forms the record carrier holder, can be inserted by hand. The video recorder has a drive motor by means of which the record carrier holder is movable between its loading position, a switching position and an operating position. When the record carrier holder is manually set from its loading position into its switching position for insertion of a cassette into the record carrier holder, the drive motor is driven via the transmission and generates at least one generator pulse. When one or more generator pulses appear(s) the drive motor is started to move the record carrier holder from its switching position into its operating position.

However, it has been found that in the known video recorder the power consumption is unnecessarily high, particularly when the video recorder is neither in a recording mode or in a reproducing mode.

SUMMARY OF THE INVENTION

It is an object of the invention to eliminate the afore-mentioned problems and to provide an improved recording and/or reproducing apparatus of the type defined in the opening paragraph, in which the afore-mentioned problems are avoided.

According to the invention, thus object is achieved in a recording and/or reproducing apparatus of the type defined in the opening paragraph in that a mode activation stage has been provided by means of which the recording and/or reproducing apparatus can be set to at least a power saving mode and an active mode, the power consumption of the recording and/or reproducing apparatus being lower in the power saving mode than in the active mode, and the mode activation stage is adapted to activate the active mode when one or more generator pulse(s) GI occur(s) while the recording and/or reproducing apparatus is in the power saving mode. In this way, it is achieved that in the recording and/or reproducing apparatus a power-saving mode can be activated, in which mode the power consumed by the recording and/or reproducing apparatus is particularly low. The low power consumption in the power-saving mode is notably also achieved in that the drive motor, which in the present case forms means for activating the active mode, does not consume any power in the power saving mode and upon a manual actuation of the record carrier holder generates generator pulses for activating the active mode without consuming any power itself. A further advantage is obtained in that a generator pulse supplied by the drive motor has a comparatively high peak voltage value, as a result of which a generator pulse can be detected particularly simply and reliably and, as a consequence, the activation of the active mode can be effected particularly reliably. A further advantage is obtained in that additional means for activating the active mode can be dispensed with, thus providing a particularly low-cost recording and/or reproducing apparatus. Of particularly advantage is the simple operation of a recording and/or reproducing apparatus in accordance with the invention in which the active mode is activated automatically when a record carrier is loaded into the record carrier holder and the record carrier holder is set by hand from its loading position into its switching position while the power saving mode is active, as a result of which a prior actuation of an activation button by the user of a recording and/or reproducing apparatus is not necessary.

In a recording and/or reproducing apparatus in accordance with the invention having the characteristic features defined in claim 1 it has proved to be advantageous if, in addition, the measures defined in the dependent claim 2 are taken. As a result of these measures, a generator pulse generated by a d.c. motor can be detected particularly simply and reliably.

In a recording and/or reproducing apparatus in accordance with the invention having the characteristic features defined in claim 1 it has proved to be advantageous if, in addition, the measures defined in the dependent claim 3 are taken. As a result of these measures, generator pulses generated by an a.c. motor can be detected particularly simply and reliably.

In a recording and/or reproducing apparatus in accordance with the invention having the characteristic features defined in the dependent claim 2 or the dependent claim 3 it has proved to be advantageous if, in addition, the measures defined in the dependent claim 4 are taken. This has the advantage that in the power saving mode the power consumption of the recording and/or reproducing apparatus is particularly low.

The above-mentioned as well as further aspects of the invention will become apparent from the two examples of embodiments described hereinafter and will be elucidated with reference to these examples.

BRIEF DESCRIPTION OF THE DRAWING

The invention will now be described in more detail with reference to a first embodiment shown in a Figure and a second embodiment not shown in the Figure, which embodiments are given by way of examples to which the invention is not limited.

DESCRIPTION OF THE PREFERRED EMBODIMENT

Figure 1:
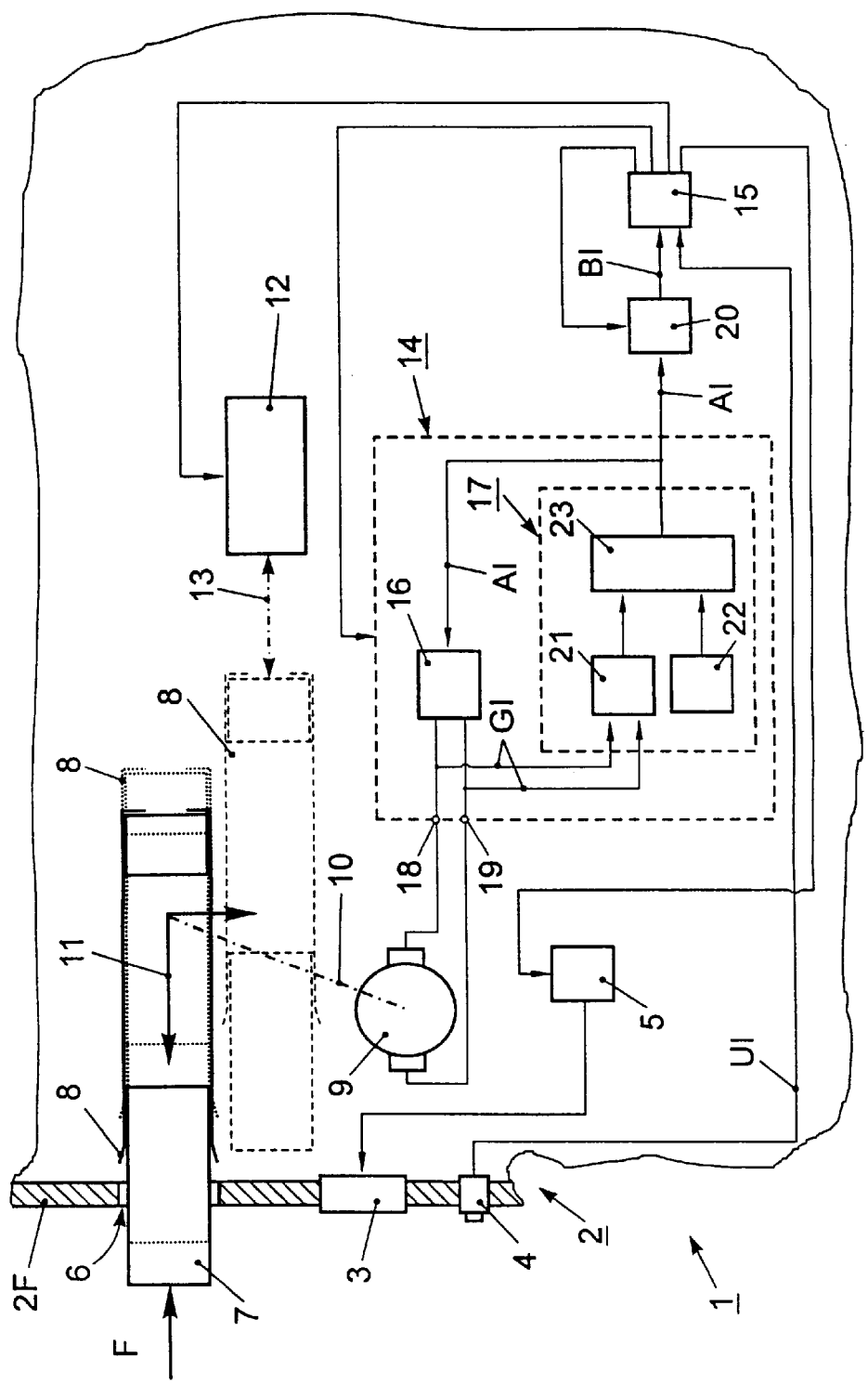
FIG. 1 is a block diagram showing a part of a video recorder in which a drive motor is driven by hand when a record carrier accommodated in a cassette is loaded into a record carrier holder and in which an active mode of the video recorder is activated in dependence on a generator pulse generated by the drive motor.

FIG. 1 shows a part of a recording and/or reproducing apparatus constructed as a video recorder in accordance with a first embodiment of the invention, having a housing which is partly cut away in the sectional view shown in FIG. 1. A display 3 and a mode selection switch 4 are arranged in a front wall 2F of the housing 2. A display driver stage 5 is connected to the display 3 and is designed to drive the display 3. The display 3 serves to display the clock time, the date and further information relating to the video recorder 1 and applied to the display driver stage 5 in a manner not shown in FIG. 1.

In its front wall 2F the housing 2 of the video recorder 1 has an opening 6 through which s cassette 7 can be introduced manually, i.e. by hand, into the housing 2. The cassette 7 accommodates a record carrier, not shown, formed by a magnetic tape. A record carrier holder 8 in its loading position and the cassette 7 situated in this holder are shown in solid lines in FIG. 1.

By exerting a force F on the cassette 7 inserted in the record carrier holder 8 the record carrier holder 8 can be moved by hand from its loading position into a switching position of the record carrier holder 8. The record carrier holder 8 in its switching position and the cassette 7 in this holder are shown in dotted lines in FIG. 1.

The video recorder 1 further comprises a drive motor 9 which serves for moving the record carrier holder 8 from the switching position of the record carrier holder 8 into an operating position of the record carrier holder 8 via a drive transmission 10. The record carrier holder 8 in its operating position and the cassette 7 are shown in dashed lines in FIG. 1. The drive transmission 10 is formed by a multi-stage transmission, not shown in FIG. 1. The movement takes place along an L-shaped path of movement 11 defined by L-shaped guide slots in which guide pins engage, which are not shown in FIG. 1. Such a drive transmission 10 for moving a record carrier holder 8 along a path of movement 11 is known from the document EP 0,475,524 A1, the subject matter disclosed therein being incorporated in the present document by reference. The drive motor 9 further serves for moving the record carrier holder 8 together with the cassette 7 held in the record carrier holder 8 from its operating position into its loading position along the L-shaped path of movement 11 upon actuation of an eject button, not shown in FIG. 1, in order to remove the cassette 7 from the video recorder 1.

The video recorder 1 further comprises signal processing means 12 which via a recording and/or reproducing line 13 cooperate with the magnetic tape of a cassette 7 present on the record carrier holder 8, which is in its operating position. In the present case, the recording and/or reproducing line 13 is formed by a scanner, not shown in FIG. 1 and having magnetic heads by means of which recording on and reproduction from the magnetic tape in the cassette 7 is possible in accordance with a helical-scan recording and/or reproducing method. Such a recording and/or reproducing line 13 is known from U.S. Pat. No. 5,319,466, the subject matter disclosed therein being incorporated in the present document by reference. A reproduction signal applied to the signal processing means 12 via the recording and/or reproducing line 13 in a reproducing mode can be processed by the signal processing means 12 and can be applied as a video signal to a television set, not shown in FIG. 1 and connected to the video recorder 1. A television signal supplied to the signal processing means 12 from an antenna, not shown in FIG. 1 and connected to the video recorder 1, can be recorded on the magnetic tape in the cassette 7 via the recording and/or reproducing line 13 in a recording mode of the video recorder 1.

The video recorder 1 further comprises a processing device 14 and a power supply stage 15. The power supply stage 15 is basically formed by a switched-mode power supply on whose outputs suitable supply voltages are available for power consuming stages of the video recorder 1. To this end, the power supply stage 15 is connected to the display driver stage 5, the signal processing means 12 and the processing stage 14.

The signal processing device 14 is formed by an integrated circuit and includes a motor control stage 16 and a comparator device 17. The drive motor 9 is connected to the first control terminal 18 and the second control terminal 19 and is adapted to supply a control voltage for causing, via the drive transmission 10, the record carrier holder 8 to be moved from its switching position into its operating position and from its operating position into its loading position. As already stated, a movement of the record carrier holder 8 from its operating position into its loading position is initiated by the actuation of an eject button, not shown in FIG. 1, upon which the motor control stage 16 supplies an appropriate control voltage to the first control terminal 18 and the second control terminal 19.

The drive motor 9 is adapted to supply normally a generator pulse GI to the first control terminal 18 and the second control terminal 19 of the processing device 14 when the record carrier holder 8 is moved from its loading position into its switching position. The comparator device 17 is connected to the first control terminal 18 and the second control terminal 19 and is adapted to supply activation information AI upon the occurrence of such a generator pulse GI, as will be described in detail hereinafter.

The video recorder 1 has a mode activation stage 20, by means of which the video recorder 1 can be set to a power saving mode and an active mode, the power consumption of the video recorder 1 being lower in the power saving mode than in the active mode. For this purpose, the mode activation stage 20 is connected to the power supply stage 15 and is adapted to supply mode information BI which characterizes the activated mode. When the mode activation stage 20 supplies mode information BI characteristic of the active mode to the power supply stage 15 the power supply stage 15 supplies suitable voltages to all the devices and stages connected to it. When the mode activation stage 20 supplies mode information BI characteristic of the power saving mode to the power supply stage 15 the power supply stage 15 only supplies the appropriate supply voltages to the mode activation stage 20 and to the processing device 14 formed by the integrated circuit.

It is to be noted that in the power saving mode only the mode activation stage 20 and the comparator device 17 should be powered with the appropriate supply voltages in order to guarantee a reliable activation of the active mode. In an advantageous manner the power consumption in the power saving mode is then very low.

The mode selection switch 4 is connected to the mode activation stage 20 and is adapted to supply switching information UI to the mode activation stage 20. The mode activation stage 20 is adapted to activate the instantaneously non-activated active mode or power saving mode by supplying mode information BI to the power supply stage 15 upon the occurrence of switching information UI in the mode activation stage 20.

The mode activation stage 20 is now connected to the comparator device 17, which can supply activation information AI to the mode activation stage 20. As a result of this, the mode activation stage 20 is adapted to activate the active mode upon the occurrence of a generator pulse GI generated by the drive motor 9 when the record carrier holder 8 is moved by hand from its loading position into its switching position while the video recorder 1 is in the power saving mode. This yields the advantage that additional means for activating the active mode are not needed because the drive motor 9 forms both means for starting the drive motor 9 in order to move the record carrier holder 8 and means for activating the active mode. Thus, a particularly low-cost recording and/or reproducing apparatus is obtained.

Means for starting a drive motor for moving a record carrier holder, which could also be used as means for activating the active mode, are known from the aforementioned document EP 0,475,524A1. The known means for moving a record carrier holder are formed by an impeller wheel having four vanes and a photoelectric light barrier. If the known means for moving the record carrier holder were used as means for activating the active mode, the light barrier would have to be powered also in the power saving mode, for which reason the power consumption of such a video recorder in the power saving mode would be substantially higher than in the case of a video recorder 1 in accordance with the invention. Since the drive motor 9, which forms means for activating the active mode, does not consume any power in the power saving mode and upon a manual movement of the record carrier holder 8 generates generator pulses GI to activate the active mode without the motor consuming any power for this, a video recorder 1 which has a particularly low power consumption in the power saving mode is obtained as a result of these simple and advantageous measures, which is very advantageous.

Another advantage is obtained in that a generator pulse GI supplied by the drive motor 9 has a comparatively high peak voltage value, as a result of which a generator pulse GI can be detected particularly simply and reliably and, as a consequence, the activation of the active mode can be effected particularly reliably.

Of particularly advantage is the simple operation of the video recorder 1 in which the active mode is activated automatically when a cassette 7 is loaded into the record carrier holder 8 and the record carrier holder 8 is set by hand from its loading position into its switching position while the power saving mode is active, as a result of which a prior actuation of the mode selection switch 4 by the user of the video recorder 1 to activate the active mode is not necessary.

The drive motor 9 in the video recorder 1 is formed by a d.c. motor. When a cassette 7 is loaded into the record carrier holder 8, which is in its loading position, the record carrier holder 8 not being moved out of its loading position for the time being, the drive motor 9 does not yet produce a generator voltage which forms a generator pulse GI. If subsequently a force F is exerted on the cassette 7 for manually moving the record carrier holder 8 and the record carrier holder 8 is, as a consequence, moved out of its loading position towards its switching position along the path of movement 11, the drive motor 9 supplies a generator voltage of rising amplitude. The amplitude of the generator voltage is then proportional to the speed of the record carrier holder 8. When the record carrier holder 8 has reached its switching position and the drive motor 9 moves the record carrier holder 8 further into its operating position, the speed of the record carrier holder 8 rapidly decreases because the force F has ceased. As a consequence of this, the amplitude of the generator voltage decreases in the switching position of the record carrier holder 8, so that the drive motor has supplied a generator pulse GI. As already stated, a generator pulse GI can be applied from the drive motor 9 to the comparator device 17.

The comparator device 17 comprises an amplifier 21, a threshold voltage generator 22 and a comparator 23. A generator voltage which forms a generator pulse GI which is applied to the comparator device 17 can be applied to the amplifier 21, which can supply an amplified generator voltage to the comparator 23. The threshold voltage generator 22 is connected to the comparator 23 and generates a threshold voltage, which it applies to the comparator 23. The comparator 23 is adapted to compare the amplitude of the amplified generator voltage and the amplitude of the threshold voltage. The comparator 23 of the comparator device 17 is adapted to supply activation information AI to the mode activation stage 20 when the amplitude of the amplified generator voltage exceeds the amplitude of the threshold voltage. As already stated, the mode activation stage 20 is adapted to set the video recorder 1 to the active mode upon the occurrence of activation information AI.

The comparator device 17 of the video recorder 1 in accordance with the present embodiment of the invention has the advantage that it can detect a generator pulse GI generated by a d.c. motor in a particularly simple and reliable manner.

It is to be noted that the threshold voltage is selected in such a manner that in the case that the drive motor 9 supplies a spurious voltage the video recorder 1 is not set to the active mode.

In a video recorder in accordance with a second embodiment of the invention, which is not shown in FIG. 1 because its construction basically corresponds to that of the video recorder 1 in accordance with the first embodiment of the invention, the drive motor is formed by an a.c. motor and the comparator device is adapted to compare generator pulses GI from the a.c. motor. Instead of the threshold voltage generator 22 the comparator device comprises a switching number memory which stores a switching number and instead of the amplifier 21 is comprises a counter for counting the generator pulses supplied by the a.c. motor. Furthermore, the comparator device in accordance with the second embodiment of the invention the comparator is adapted to compare two numbers, namely the number of counted generator pulses GI and the switching number. Generator pulses GI generated by the a.c. motor when the record carrier holder is moved from its loading position into its switching position can be applied to the counter. The counter is adapted to count the number of generator pulses GI appearing after activation of the power saving mode and supplies information about the actual number of counted generator pulses GI to the comparator. The comparator is adapted to compare the number of counted generator pulses GI with the switching number and to supply activation information AI to the mode activation stage when the number of counted generator pulses GI exceeds the switching number. As already described for the video recorder 1 in accordance with the first embodiment of the invention the mode activation stage 20 is adapted to set the video recorder 1 to the active mode upon the occurrence of activation information AI.

The comparator device of the video recorder in accordance with the second embodiment of the invention has the advantage that it can detect a generator pulse GI generated by an a.c. motor in a particularly simple and reliable manner.

It is to be noted that the switching number is selected in such a manner that in the case that the a.c. motor supplies spurious generator pulses GI the video recorder is not set to the active mode.

It is to be noted that a recording and/or reproducing apparatus in accordance with the invention can alternatively be constituted by a CD player, a CD-ROM drive or a chip card reader.

What is claimed is:

1. A recording and/or reproducing apparatus (1) comprising a record carrier holder (8) constructed to receive a record carrier (7) in a loading position of the record carrier holder (8), and comprising a drive motor (9) serving to move the record carrier holder (8) from a switching position of the record carrier holder (8) into an operating position of the record carrier holder (8) via a drive transmission (10), the drive motor (9) being adapted to supply at least one generator pulse (GI) when the record carrier holder (8) is moved by hand from the loading position into the switching position, characterized in that a mode activation stage (20) has been provided by means of which the recording and/or reproducing apparatus (1) can be set to at least a power saving mode and an active mode, the power consumption of the recording and/or reproducing apparatus (1) being lower in the power saving mode than in the active mode, and the mode activation stage (20) is adapted to activate the active mode when one or more generator pulse(s) GI occur(s) while the recording and/or reproducing apparatus (1) is in the power saving mode.

2. A recording and/or reproducing apparatus (1) as claimed in claim 1, characterized in that the drive motor (9) is formed by a d.c. motor, and a comparator device (17) has been provided which is arranged to receive a generator voltage generated by the d.c. motor and forming a generator pulse (GI) and which is adapted to compare the amplitude of the generator voltage with the amplitude of a threshold voltage, and the comparator device (17) is adapted to supply activation information (AI) to the mode activation stage (20) when the amplitude of the generator voltage exceeds the amplitude of the threshold voltage, and the mode activation stage (20) is adapted to activate the active mode when activation information (AI) occurs.

3. A recording and/or reproducing apparatus (1) as claimed in claim 1, characterized in that the drive motor (9) is formed by an a.c. motor, and a comparator device (17) has been provided which is arranged to receive at least one generator pulse (GI) generated by the a.c. motor and which is adapted to count the at least one generator pulse (GI) and to compare the number of counted generator pulses with a switching number, and the comparator device (17) is adapted to supply activation information (AI) to the mode activation stage (20) when the number of counted generator pulses (GI) exceeds the switching number, and the mode activation stage (20) is adapted to activate the active mode when activation information (AI) occurs.

4. A recording and/or reproducing apparatus (1) as claimed in claim 2, characterized in that in the power saving mode in principle only the comparator device (17) and the mode activation stage (20) are held in a power-consuming state.

* * * * *